H. D. HILDEBRAND.
METHOD OF INCREASING THE FLOW OF GAS AND VAPORS FROM WELLS.
APPLICATION FILED JULY 24, 1913.
1,126,215.
Patented Jan. 26, 1915.
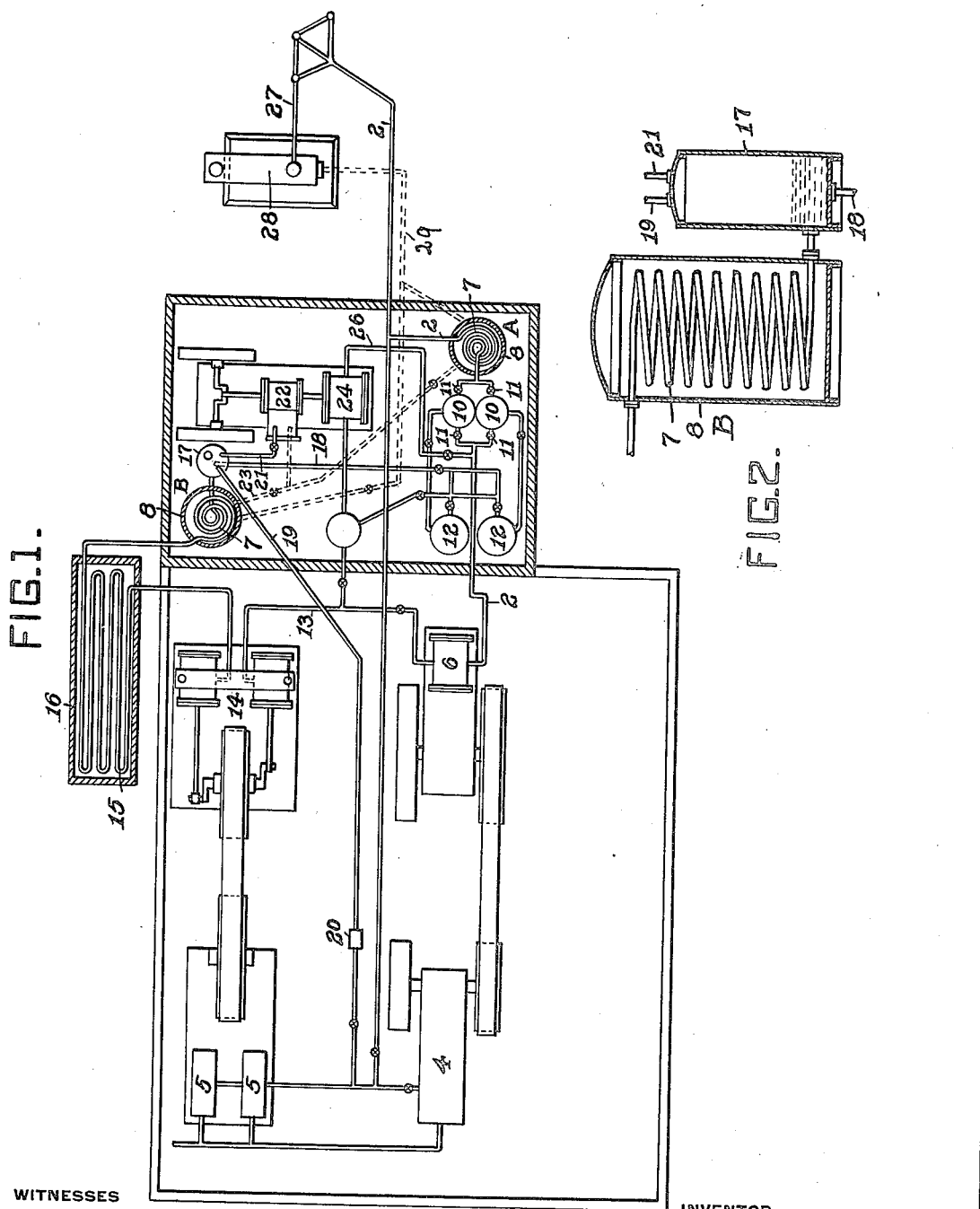

UNITED STATES PATENT OFFICE.

HARRY D. HILDEBRAND, OF PITTSBURGH, PENNSYLVANIA, ASSIGNOR TO HOPE ENGINEERING AND SUPPLY COMPANY, OF PITTSBURGH, PENNSYLVANIA, A CORPORATION OF WEST VIRGINIA.

METHOD OF INCREASING THE FLOW OF GAS AND VAPORS FROM WELLS.

1,126,215.    Specification of Letters Patent.    Patented Jan. 26, 1915.

Application filed July 24, 1913. Serial No. 781,039.

*To all whom it may concern:*

Be it known that I, HARRY D. HILDEBRAND, residing at Pittsburgh, in the county of Allegheny and State of Pennsylvania, a citizen of the United States, have invented or discovered certain new and useful Improvements in Methods of Increasing the Flow of Gas and Vapors from Wells, of which improvements the following is a specification.

The invention described herein relates to a method whereby an increased yield of gasolene may be obtained from oil and gas wells, and consists generally stated in establishing and maintaining a substantial and effective difference between the temperature of the gas and vapors in the lower portion of the well and that of gases and vapors in the pipe lines and connections leading from the well.

The invention is hereinafter more fully described and claimed.

In the accompanying drawings forming a part of this specification, Figure 1 is a diagrammatic view illustrating a form of apparatus for carrying out my improved method; Fig. 2 is a sectional view of a form of refrigerator and separator.

It has been found that the production of gasolene from wells is greater in cold weather due it is belived to reduction of the temperature of the gases flowing from the comparatively warm lower portions of the wells through the upper portions and pipe lines leading from the wells, which being subjected to atmospheric temperature, are much cooler. The reduction of temperature produces a considerable reduction of the volume of the gases at points where cooling occurs thereby inducing a proportional increase of flow of the warmer gases and reducing back pressure in the wells. As is well known the vaporization of a liquid is dependent on the surface pressure, and as the freer flow of gases above mentioned will reduce pressure in the wells the rate of vaporization of the lighter hydrocarbons as gasolene in the well will be greater. In order to render these beneficial effects due to atmospheric conditions, constant and more highly efficient, provision is made for maintaining at all times an effective difference between the temperatures in the lower portions of the wells and its upper portions and pipe line connection and also for establishing a more effective difference than is attainable by natural or atmospheric conditions.

The desired difference of temperature can be produced in two ways, *i. e.*, by artificially reducing the temperature of the gases in the upper portions of the wells or pipe line connections, or by heating the gases in the lower portions to a temperature substantially higher than the temperature of the upper portions of the well and its pipe line connections, or both of these methods may be employed.

The cooling of the gases above referred to not only produces an increased flow from the wells but also decreases the cost of compression incident to extracting condensable elements from the fluid flowing from the wells in proportion to the reduction of volume due to the cooling.

While any suitable means may be employed for reducing the temperature of the gases and vapors as they flow from the well, it is preferred to employ an intensely cold fluid produced as a by-product in treating hydrocarbon gases and vapors for the extraction of gasolene. In the form of condensing apparatus shown herein, the gases chilled as hereinafter described are forced by the vacuum pump 6 which effects a certain degree of compression, through pipe 13 to the main compressing pumps 14 of any suitable construction and operated by suitable motors as gas engines 5. The compressed gases flow from the compressors 14 through any suitable form of apparatus for abstracting the heat generated by compression. A suitable form of cooler consists of a coil 15 arranged in the tank 16 through which water or other cooling fluid is caused to flow to extract the heat of compression from the gases. After passing through the coil 15, the gases are subjected while under compression to a sufficiently low temperature to effect the condensation of practically all condensable portions. Any suitable form or construction of apparatus for producing low temperatures known in the art may be employed for the purpose as for example that indicated at B, and more fully shown in Fig. 2 consisting of a coil 7 connected at one end to the coil 15, arranged in a shell 8 connected by a pipe to the source of cold fluid. The coil 7 of the refrigerator B, is connected to a separating tank 17 into which all the uncondensed gases and the condensed liquids are discharged under pressure. From this separator the liquid is forced through the pipe 18 into one or other of the storage tanks 12. A portion of the gases from which the liquid has been separated flows through the pipe 19 for use in the gas engines employed for operating the vacuum pump and compressors, a reducing valve 20 being arranged at a suitable point in said pipe.

As is well known a low temperature can be produced by the mere expansion of compressed gases, but a much lower temperature can be obtained if the expansive force be utilized in performance of work, hence as it is desirable to effect a reduction in the temperature of the gases from the well, the gases in the separator 17, which are under high pressure are conducted by a pipe 21 to the engine cylinder 22 wherein they are used expansively, and the expanded exhaust gases from the cylinder are conducted by pipes 23 to the shells of refrigerators A and B.

As shown in Fig. 1 one end of the coil 7 of the refrigerator A is connected to the line of pipe 2 leading from one or more of the wells, while the opposite end of the coil is connected to the vacuum pump 6 operated by the motor 4. It will be understood that the cooling of the gas as it comes from the well will greatly reduce its volume and consequently cause a more rapid flow of the well and reduction of pressure therein. This chilling or reduction of temperature will not only cause an increased flow from the wells, but also reduce the load on the vacuum and compressing pumps.

As considerable condensation may be effected in the refrigerator A, collecting drums 10 are arranged on the outlet side of the coil 7 and suitable valves 11 are arranged in the pipes leading to and from the drums so that as one drum is filled it may be cut out and the other drum cut-in to receive the condensed liquid. While the latter drum is being filled the liquid is forced from the other drum and into one of the storage tanks 12.

The engine 22 may be employed for any desired purpose around the plant as for example to operate a vacuum pump 24 to deliver gas under pressure to the compressors 14. The inlet of the pump 24 is connected by a pipe 26 to the pipe 2 on the delivery side of the refrigerator A.

As will be readily understood the reduction of pressure on the oil in the well due to the reduction of volume by cooling in refrigerator A, and the action of the vacuum pump will permit of a more rapid evaporation of the light hydrocarbons in the well, thus increasing the yield of such light hydrocarbons considerably above the flow under normal conditions. A further and very material increase can be obtained by raising the temperature in the lower portion of the well. This heating can be effected in many ways, as by the generation of heat *in situ*, or by conveying the heat down into the well by a fluid conveyer as steam or gas. While the invention is not limited as regards the broad terms of claims to any particular method of raising the temperature in the lower portion of the well, the means shown herein are well adapted to that purpose. A line of pipe 27 extends from a conveniently located boiler 28 down into the well so as to discharge the hot steam at the desired depth. While the boiler may be heated in any suitable manner, it is preferred to utilize a by-product of the method described herein, *i. e.*, the gas from which the condensable portions have been removed and which has been utilized to produce refrigerating effects. To this end the shells of one or both of the refrigerators A and B have their outlets connected to pipes 29 extending to the fire-box of boiler 28.

I claim herein as my invention:

1. The method herein described of increasing the flow of gas and vapors from a well, which consists in substantially reducing the temperature of the gas and vapors flowing from the well.

2. The method herein described of increasing the flow of gas and vapors from a well, which consists in increasing the temperature in the lower portion of the well, and reducing the temperature of the heated gas and vapors flowing from the well.

3. The method herein described of increasing the flow of gas and vapors from a well, which consists in mechanically drawing the gas and vapors from the well as by a vacuum pump and substantially reducing the temperature of the gas and vapor as it comes from the well.

In testimony whereof, I have hereunto set my hand.

HARRY D. HILDEBRAND.

Witnesses:
ALICE A. TRILL,
F. B. JOYCE.